(No Model.) 2 Sheets—Sheet 1.
L. H. ROGERS.
PACKET OR PAD FOR ELECTRIC BATTERIES.
No. 465,206. Patented Dec. 15, 1891.
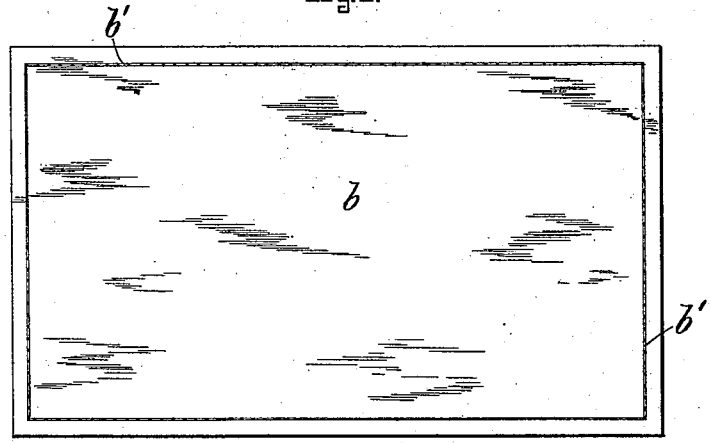
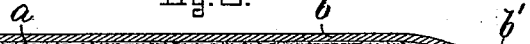
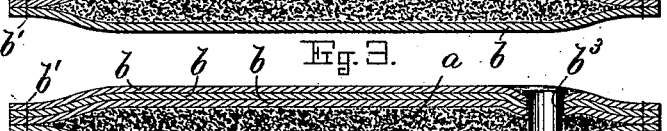
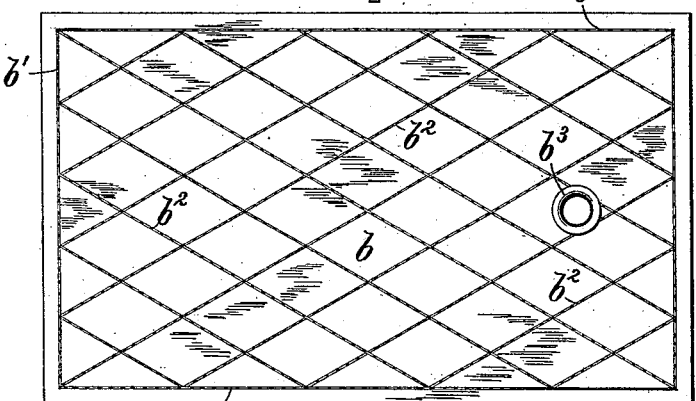
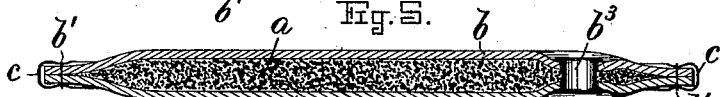
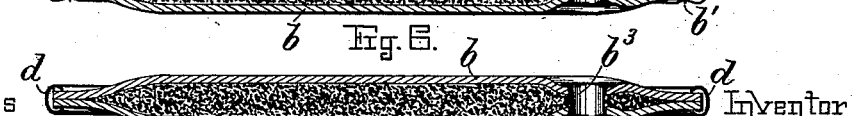
Witnesses
Frank E. Greenwood.
M. H. Avery.
Inventor
Lewis H. Rogers
by
Henry Chadbourn
his Atty.

(No Model.) 2 Sheets—Sheet 2.

L. H. ROGERS.
PACKET OR PAD FOR ELECTRIC BATTERIES.

No. 465,206. Patented Dec. 15, 1891.

Witnesses
Frank E. Greenwood
Anna M. Dolloff

Inventor
Lewis H. Rogers
by
Henry Chadbourne
his Atty.

UNITED STATES PATENT OFFICE.

LEWIS H. ROGERS, OF BROOKLINE, MASSACHUSETTS.

PACKET OR PAD FOR ELECTRIC BATTERIES.

SPECIFICATION forming part of Letters Patent No. 465,206, dated December 15, 1891.

Application filed February 20, 1891. Serial No. 382,177. (No model.)

*To all whom it may concern:*

Be it known that I, LEWIS H. ROGERS, a citizen of the United States, residing at Brookline, in the county of Norfolk and State of Massachusetts, have invented certain new and useful Improvements in Packets or Pads for Electric Cells; and I do hereby declare the following to be a full, clear, and exact description of the invention, such as will enable others skilled in the art to which it appertains to make and use the same.

This invention relates to improvements in packets or pads to be used in a galvanic cell to produce the electrolyte or active part of the cell. It consists in inclosing an electrolytic chemical within a casing or envelope made of suitable absorbent or porous material, which is to be kept in a dry state until the cell is to be charged and used, when it is to be moistened to dissolve the chemical and bring the electrolytic solution thus produced into contact with the positive and negative elements of the cell, which rest against the casing of the pad, so as to generate an electric current.

It further consists in means to retard the polarization of the cell caused by the electrolytic chemical coming into too close contact with either of the elements of the cell, also in means to accelerate the starting of the action of the cell and in minor details of construction, as will be fully set forth in the specification and claims.

The invention is carried out as follows, reference being had to the accompanying drawings, whereon—

Figure 7:
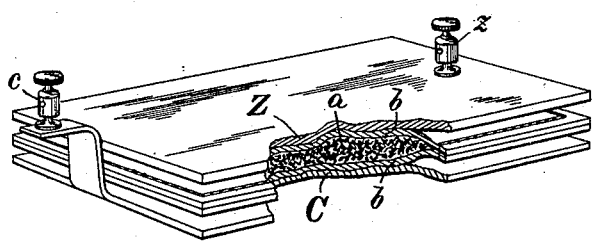
Figure 8:
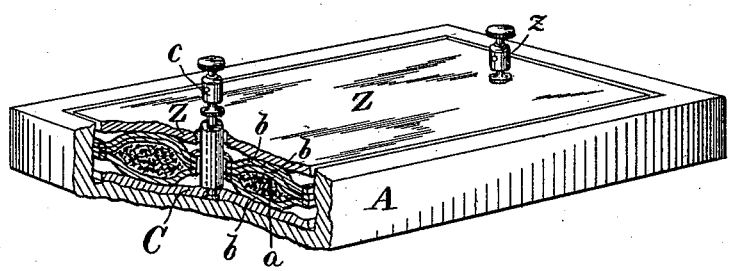

Figure 1 represents a plan view of one of the forms of my improved packet or pad; Fig. 2 represents a central longitudinal section of the same. Fig. 3 represents a similar section of the packet, showing the means employed to retard polarization of the cell. Fig. 4 represents a plan view of a second or modified form of the packet or pad. Figs. 5 and 6 represent central longitudinal sections of other modified forms of the same. Fig. 7 represents a perspective view, partly in section, of an electric cell consisting of a positive element, a negative element, and one of my improved packets or pads interposed between said elements and resting against them. Fig. 8 represents a perspective view, partly in section, of an electric cell consisting of a positive element, a negative element, one of my improved packets or pads introduced between said elements and resting against them both, the terminal of the negative element projecting through perforations in the pad and in the positive element, and showing the complete cell resting within a box or case.

Similar letters refer to similar parts on the different parts of the drawings.

The sulphate of copper or other electrolytic chemical $a$ in a dry state is inclosed within a casing or envelope made of sheets of blotting-paper $b\ b$ or other suitable absorbent or porous material, preferably sewed together at their edges, as shown at $b'$ in Figs. 1, 2, 3, and 4. This constitutes a very neat and convenient form in which to transport the electrolytic chemical and allows the amount of the chemical contained within the packet to be previously weighed or measured and varied according to the variations in the time it is desired to have the cell generate an electric current, the various amounts required having been predetermined by experiments, and if so desired, the packet may be suitably marked to indicate the time in which it will generate a current within the cell.

In Figs. 7 and 8, Z represents the positive element of an electric cell, having the terminal $z$, which element is preferably made of zinc, and in said figures C represents the negative element of the cell having the terminal $c$, which element is preferably made of copper. The packet or pad containing the electrolytic chemical is moistened and placed between the elements Z and C, resting against them both when the cell is generating an electric current, as shown in said figures. In Fig. 8 the elements forming the cell are shown as placed within a box or case A and having the terminal $c$ of the negative element passing upward through perforations in the packet or pad and in the positive element Z, as described hereinafter.

If it is desired to introduce a resistance between either the positive or negative elements of the battery and the electrolytic chemical to retard the polarization of the battery, I increase the thickness of the absorbent material on the side of the packet or pad which is to rest against said element by either increasing the number of sheets of absorbent material, or using one sheet of greater thickness, or both, increasing the thickness and the number of sheets used on that side of the packet or pad. In Fig. 3 I have shown this resistance as consisting of an increased number of the sheets $b\ b$; but I do not wish to confine myself to the construction shown in said figure as it may be varied, as above described, without departing from the spirit of this portion of my invention.

To prevent the inclosed chemical from being shaken into any one place in the packet or pad and to retain it more evenly distributed over the entire packet or pad, the same may be quilted, as shown at $b^2$ in Fig. 4; but this is not necessary to the working of the packet, although it may be desirable in some places.

When the packet or pad is to be used in a cell in which the terminal of one of the elements of the cell is to pass through said packet, I prefer to perforate the packet and provide such perforation with an eyelet $b^3$ or with a row of stitching or other binding on the packet around such perforation, as shown in Fig. 8; but it is not essential to use the packet in such cells alone, as it is equally well adapted to be used in other forms of cells, as shown in Fig. 7.

If so desired, the packet may be supplied with a binding $c$, as shown in Fig. 5, which binding is sewed on the outer edges of the packet to strengthen the same, or it may be supplied with a metal binding $d$, as shown in Fig. 6, adapted to hold the chemical within the packet by clamping the sheets of absorbent or porous material together, or the same may be cemented or glued together in any other suitable manner.

I do not wish to confine myself to the exact form of the casing or envelope shown in the drawings, as the same may be made in various forms—as, for instance, in the form of bags, envelopes, &c. Nor do I wish to confine myself to the use of blotting-paper as the material within which the electrolytic chemical is to be inclosed, as felt and various kinds of cloth, or other well-known absorbent or porous material, might be used to equal advantage without departing from my invention; also the chemical used to produce the electrolytic solution may be varied, according to the kind of material used to form the positive and negative elements of the cell.

To use my improved packet or pad I proceed as follows: If I use a cell having a sheet of copper for one element and a sheet of zinc for the other or opposite element, and a packet containing a quantity of sulphate of copper for an electrolyte, one of the elements of the cell—as, for instance, the sheet of copper—is placed within the cell. The packet is then placed against the sheet of copper and having the increased thickness of absorbent material opposite to the side resting against the copper. A sufficient quantity of water to dampen the entire packet is then poured upon the packet and the other element of the cell—as, for instance, the sheet of zinc—is placed within the cell, so as to rest against the thickest part of the absorbent material of the packet, as shown in Figs. 7 and 8. If the sheets of copper and zinc are then connected by a metallic connection, an electric current will be generated within the cell. It is not essential that the packet or pad should be dampened after it has been placed within the cell, as it may to equal advantage be dampened just before it is to be introduced within the cell.

It will be seen that the increased thickness of the absorbent or porous material on one side of the packet or pad will act in a similar manner and accomplish the same result as the porous earthenware pot used in the cell known as the "Daniels" cell.

It is not essential that the absorbent material should be increased in thickness, as described, to retard polarization, for the same result would be obtained if the chemical were incased within an envelope made of absorbent or porous material of even thickness throughout, and the resistance produced by the introduction of a suitable number of extra and independent sheets of absorbent or porous material between the proper element of the cell and the packet or pad.

To accelerate the starting of the action of an electric cell in which one of my improved packets or pads is used to form the electrolyte, I prefer to use absorbent or porous material which has been previously saturated with a solution of the chemical formed by the action of the cell—as, for instance, in the cell above described, composed of sheets of copper and zinc, with a packet containing sulphate of copper for the electrolytic chemical, I would saturate the absorbent material which is to rest against the zinc with a solution of sulphate of zinc and dry such absorbent material before incasing the sulphate of copper within it. This causes the cell to generate an electric current as soon as the copper, zinc, and moistened packet have been brought together and the metallic circuit has been closed between the copper and zinc without having to wait for sufficient sulphate of zinc to be formed by the decomposition of the sulphate of copper and consequent production of sulphate of zinc. The chemical used to saturate the absorbent or porous material depends upon the material used in forming the different elements of the cell, and may be varied accordingly without departing from my invention.

Having thus fully described the nature, construction, and operation of my invention, I wish to secure by Letters Patent and claim—

1. The herein-described packet or pad for an electric cell, consisting of a casing or envelope of absorbent material adapted to be placed between and to rest against both the positive and negative elements of the cell, said casing containing a charge of electrolytic chemical, which chemical dissolves and forms the active material of the cell when the pad is moistened, substantially as set forth and described.

2. The herein-described packet or pad for an electric cell, consisting of sheets of blotting-paper joined together at their edges, forming an envelope or casing, and a charge of an electrolytic chemical contained between said sheets of blotting-paper, said pad being adapted to be placed between and to rest against both the positive and negative elements of the cell, to form the active material when said pad is moistened, as set forth and described.

3. A packet or pad for an electric cell, consisting of an electrolytic chemical and a casing or envelope of absorbent or porous material containing said chemical, substantially as described, having a portion of said casing made of increased thickness to retard polarization of the cell, as set forth.

4. A packet or pad for an electric cell, consisting of an electrolytic chemical, a casing or envelope of absorbent or porous material containing said chemical, and a perforation in said packet having an eyelet or other binding, for the purpose as set forth.

5. An electric cell consisting of a positive element, a negative element, and a packet or pad consisting of an electrolytic chemical, a casing or envelope of absorbent or porous material incasing said chemical placed between the elements of the cell and adapted to form the electrolyte by moistening said packet, as set forth and described.

6. An electric cell consisting of a positive element, a negative element, and a packet or pad introduced between the two elements, consisting of an electrolytic chemical incased within a casing or envelope of absorbent or porous material, said casing being of an increased thickness on one side to retard polarization of the cell, as set forth.

7. A packet or pad for an electric cell, consisting of an electrolytic chemical, a casing or envelope containing said chemical, made of absorbent or porous material, said casing having been previously saturated with a solution of the resulting chemical produced by the electrolysis of the inclosed chemical, whereby the starting of the action of the cell is accelerated, as set forth and described.

In testimony whereof I have affixed my signature in presence of two witnesses.

LEWIS H. ROGERS.

Witnesses:
HENRY CHADBOURN,
FRANK E. GREENWOOD.